United States Patent [19]
Tarr et al.

[11] Patent Number: 5,884,611
[45] Date of Patent: Mar. 23, 1999

[54] EFFERVESCENT INJECTOR FOR DIESEL ENGINES

[75] Inventors: Yul J. Tarr; Laszlo D. Tikk; Wayne A. Eckerle; Lester L. Peters, all of Columbus, Ind.

[73] Assignee: Cummins Engine Company, Inc., Columbus, Ind.

[21] Appl. No.: 949,755

[22] Filed: Oct. 14, 1997

[51] Int. Cl.⁶ .................................................. F02M 23/00
[52] U.S. Cl. ..................... 123/531; 239/408; 239/533.2
[58] Field of Search .................. 123/26, 531; 239/533.2, 239/533.3, 408

[56] References Cited

U.S. PATENT DOCUMENTS

| | | |
|---|---|---|
| 4,167,921 | 9/1979 | Steinwart . |
| 4,284,043 | 8/1981 | Happel . |
| 4,381,077 | 4/1983 | Tsumura et al. .................... 123/531 |
| 4,546,739 | 10/1985 | Nakajima et al. . |
| 4,796,577 | 1/1989 | Baranescu . |
| 4,823,756 | 4/1989 | Ziejewski et al. .................... 123/531 |
| 4,836,453 | 6/1989 | Poehlman .................... 239/408 |
| 4,856,713 | 8/1989 | Burnett . |
| 4,892,065 | 1/1990 | List .................... 123/531 |
| 4,979,479 | 12/1990 | Furukawa .................... 123/531 |
| 5,088,467 | 2/1992 | Mesenich .................... 123/531 |
| 5,129,381 | 7/1992 | Nakajima .................... 123/531 |
| 5,172,865 | 12/1992 | Takano et al. .................... 123/531 |
| 5,199,398 | 4/1993 | Nylund . |
| 5,220,900 | 6/1993 | Wakeman . |
| 5,241,938 | 9/1993 | Takagi et al. . |
| 5,711,281 | 1/1998 | Lorraine .................... 123/531 |

FOREIGN PATENT DOCUMENTS

| | | |
|---|---|---|
| 1 284 687 | 12/1968 | Germany . |
| 26 56 276 | 6/1978 | Germany . |
| 717685 | 11/1954 | United Kingdom . |

*Primary Examiner*—John T. Kwon
*Attorney, Agent, or Firm*—Sixbey, Friedman, Leedom & Ferguson; David S. Safran

[57] ABSTRACT

An effervescent fuel injector, particularly one suitable for diesel and direct injection engine applications, which is capable of injecting, particularly intermittently, an atomized fuel spray with droplets of a size in the range of 5–6 micron SMD without requiring high pressures is achieved in a preferred embodiment effervescent fuel injector of the valve covered orifice (VCO) type having primary and secondary nozzle valves which remain closed when the control valve is not actuated, but which open one or two sets of nozzle orifices depending on fuel volume requirements. A three-way, on-off control valve is used to trigger commencement of the supply of gas via a control valve simultaneously with opening of at least some of the nozzle orifices. Gas and fuel are mixed in a mixing chamber located upstream of the nozzle valves in a manner creating a gas-fuel aeration, and as the aeration is sprayed from the nozzle orifices, the gas expands rapidly breaking the fuel into fine droplets.

19 Claims, 3 Drawing Sheets

EFFERVESCENT INJECTOR FOR DIESEL ENGINES

BACKGROUND OF THE INVENTION

1. Field of the Invention

The present invention relates to fuel injectors for diesel engines. In particular, the invention relates to such a fuel injector in which a high pressure gas is mixed with the fuel to obtain improved atomization of the fuel being injected into the engine.

2. Description of Related Art

U.S. Pat. No. 4,167,921 to Steinwart discloses a fuel injector having an air chamber surrounding a fuel injection head, where "air assist" type atomization of the fuel is performed using air that is introduced into the air chamber from the atmosphere or the air induction duct, and from which the atomized fuel is injected through an outlet opening of the air chamber. The injector head is adjustable in relation to the outlet opening in accordance with the load setting of the engine. The cross-section of the outlet opening is variable between that needed for idle running and that needed for full load. However, because the outlet opening of the air chamber is always open and Steinwart introduces air into the air chamber at low pressure downstream of the injection nozzle, precise control of the fuel air cannot be obtained and the system cannot be applied to diesel and other direct injection engine applications.

U.S. Pat. No. 5,241,938 to Takagi et al. discloses a fuel injector having a plurality of cylindrical air passages that allow air to be introduced by suction into a mixing chamber that is open to the engine intake manifold in directions causing the air form to intersect a supply of fuel introduced from a fuel injector into the mixing chamber for atomizing the fuel. As is the case for the Steinwart system, precise control of the fuel air cannot be obtained and the system cannot be applied to diesel and other direct injection engine applications.

However, with the imposing of more stringent diesel engine emissions regulations, high efficiency atomization of the fuel is necessary to produce combustion with the required low levels of emissions. One key measure of spray quality is the Sauter Mean Diameter (SMD) of the spray droplets, with respect to which the smaller the SMD, the better the spray quality with spray droplet sizes in the range of 5–6 micron SMD being sought. Unfortunately, to achieve a spray with droplets of such a size, current liquid fuel injection systems demand extremely high pressures, unique materials and expensive manufacturing techniques.

Thus, a need exists for a fuel injection system which can obtain the desired degree of atomization at lower pressures, so that manufacturing costs can be reduced while still meeting emissions requirements. A type of atomizer which is known to obtain significant improvement in liquid atomization relative to air assist atomizers at lower pressures is an effervescent atomizer. In effervescent atomization, a gas is injected into the flowing liquid stream upstream of a discharge orifice and upon exiting the orifice the gas expands very quickly causing the liquid to break up into small drops. However, fuel injectors for internal combustion engines which operate on the effervescent atomization principle are, as of yet, unknown.

SUMMARY OF THE INVENTION

In view of the foregoing, it is a primary object of the present invention to provide an effervescent fuel injector, particularly one suitable for diesel and direct injection engine applications.

In conjunction with the preceding object, it is a more particular object to provide an effervescent fuel injector which is capable of injecting, particularly intermittently, an atomized fuel spray with droplets of a size in the range of 5–6 micron SMD without requiring high pressures.

These and other objects of the present invention are achieved by a preferred embodiment effervescent fuel injector of the valve covered orifice (VCO) type having primary and secondary nozzle valves which remain closed when the control valve is not actuated, but which open one or two sets of nozzle orifices depending on fuel volume requirements. A three-way, on-off slenoid valve is used to trigger commencement of the supply of gas via a gas control valve simultaneously with opening of nozzle orifices. Gas and fuel are mixed in a mixing chamber located upstream of the nozzle valves in a manner creating a gas-fuel foam, and as the aerated fuel is sprayed from the nozzle orifices, the gas expands rapidly breaking the fuel into fine droplets.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
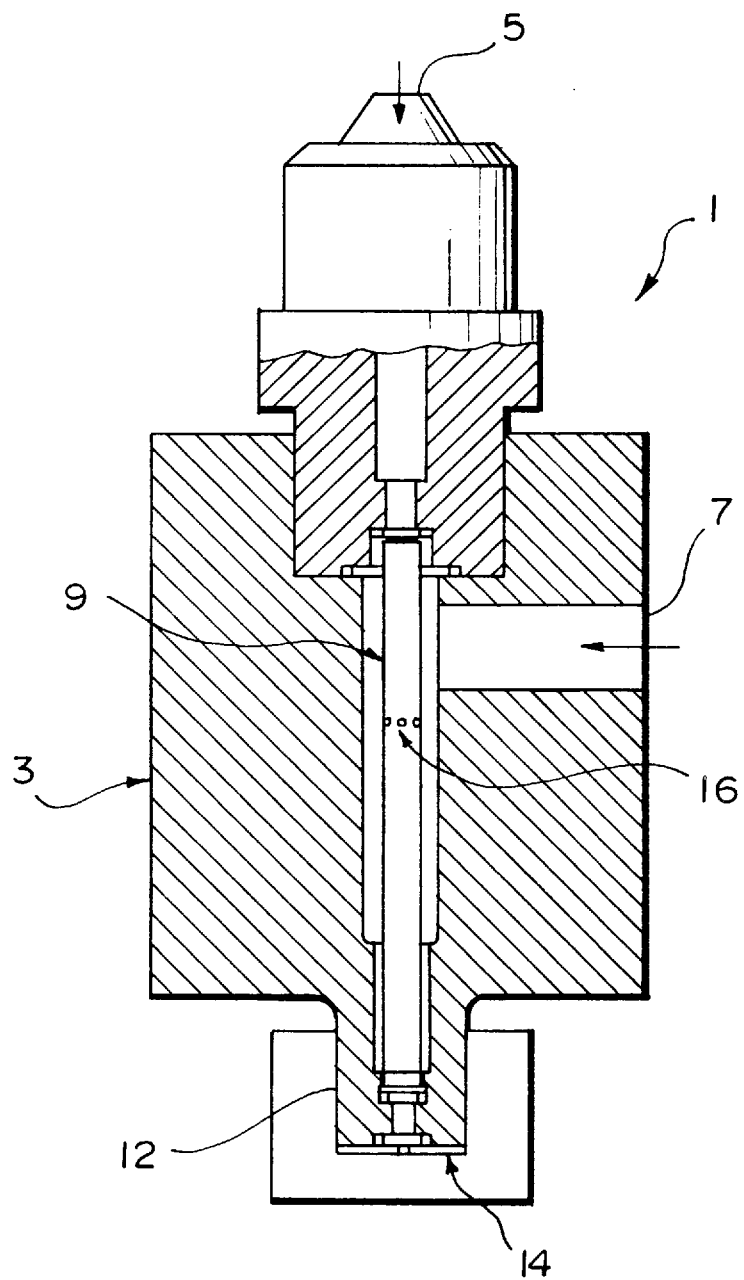
FIG. 1 is a schematic cross section of an effervescent diesel injector of a continuous flow type.

FIG. 1 shows in simplified form a continuous flow, effervescent diesel type injector 1 of the open nozzle type which embodies the basic concepts of the present invention. Injector 1 has an injector body 3 to which a fuel supply is connected at fuel inlet passage 5 and a supply of pressurized gas, such as air, is connected at a gas inlet passage 7. A mixing chamber is formed by the interior of an aeration tube 9 that extends between the inner end of fuel inlet passage 5 and an injection nozzle 12 formed at the opposite end of the injector body 3. An orifice plate 14 is mounted over the nozzle outlet. A ring of holes 16, e.g. 8 holes of 0.34 mm diameter, are formed in the aeration tube 9 at a sufficient distance from the orifice plate 14, e.g., bubbles 5 cm, to enable sufficient aeration of the quantity of fuel in the tube causing gas to be entrapped in fuel before it is caused to exit the orifice plate.

The pressures of the supplied fuel and gas are variable, but the gas pressure is always higher than the fuel pressure to prevent the fuel from flowing out of the holes 16 and traveling up the gas inlet passage 7. For example, a maximum gas pressure of approximately 8100 psi can be used with a maximum fuel pressure of around 8000 psi. Controlling of the variable fuel pressure is used to set the flow rate of injection while the variable gas pressure is used to set the gas-liquid ratio (GLR) of the foam-like mixture produced within mixing chamber formed by the aeration tube 9.

Figure 2:
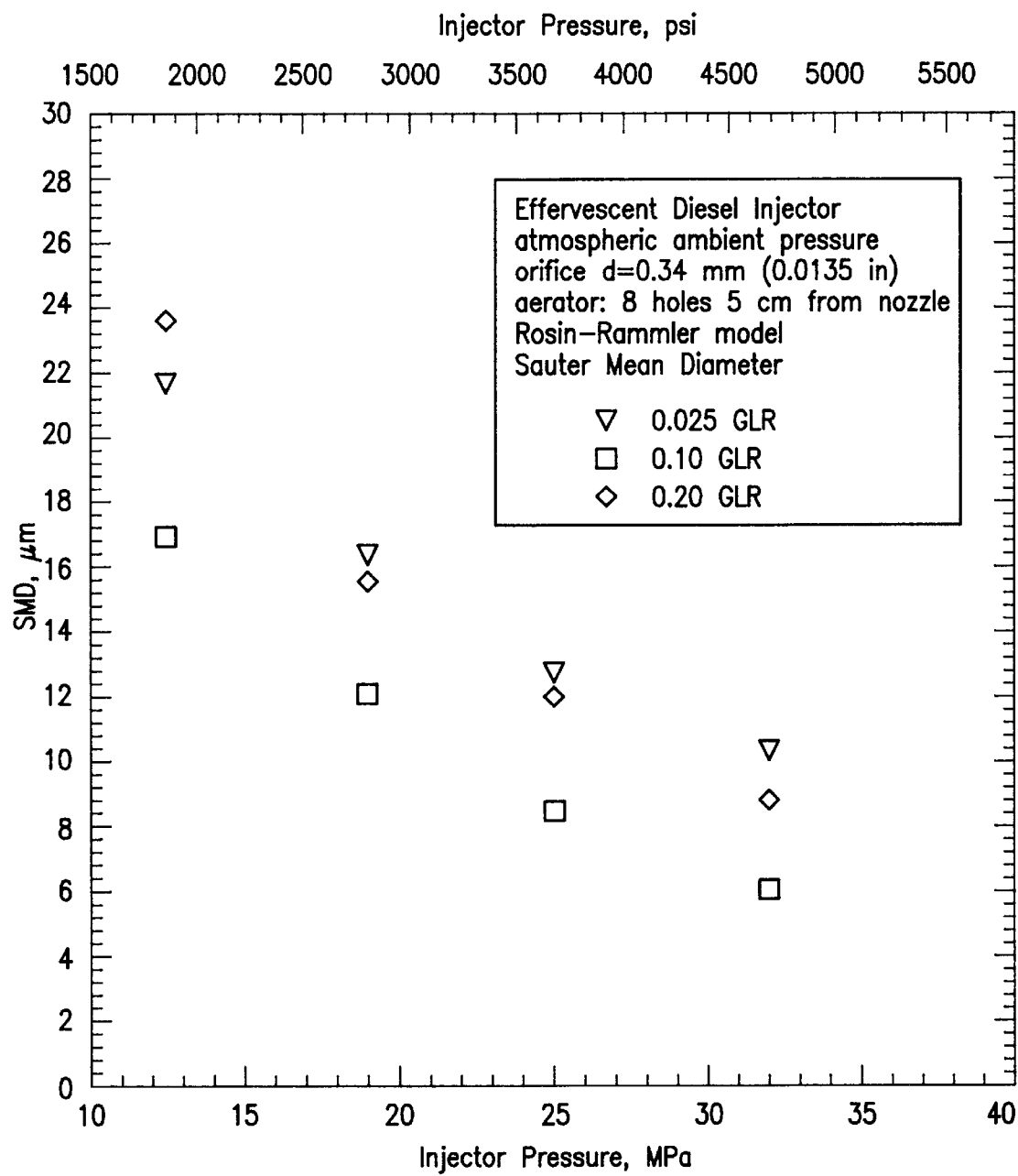
FIG. 2 is a graph depicting the relationship between spray droplet size and injection pressure for three different gas-liquid mass ratios obtained using the FIG. 1 injector.

FIG. 2 shows the results of tests conducted with the fuel injector of FIG. 1 to determine the relationship between injector pressure and the Sauter Mean Diameter (SMD) using each of three different gas-liquid ratios (GLRs). As can be seen, the SMD is inversely proportional to the injection pressure for all three GLRs tested. Based on these results, it is clear that an SMD of 5 or less can be obtained at pressures of 8–10 ksi or less despite wide variations in the GLR. This is a dramatic improvement over conventional liquid diesel injectors which require pressures of around 30–35 ksi to obtain SMD values in the 5–6 micron range.

However, while the present invention is applicable to open nozzle type injectors, a valve covered orifice (VCO) type injector is preferred because it provides a sharp end of injection. Furthermore, the absence of a sac in VCO type nozzles eliminates fuel expansion after the needle is closed, which could be excessively long in the case of gas-fuel mixtures.

Figure 3:
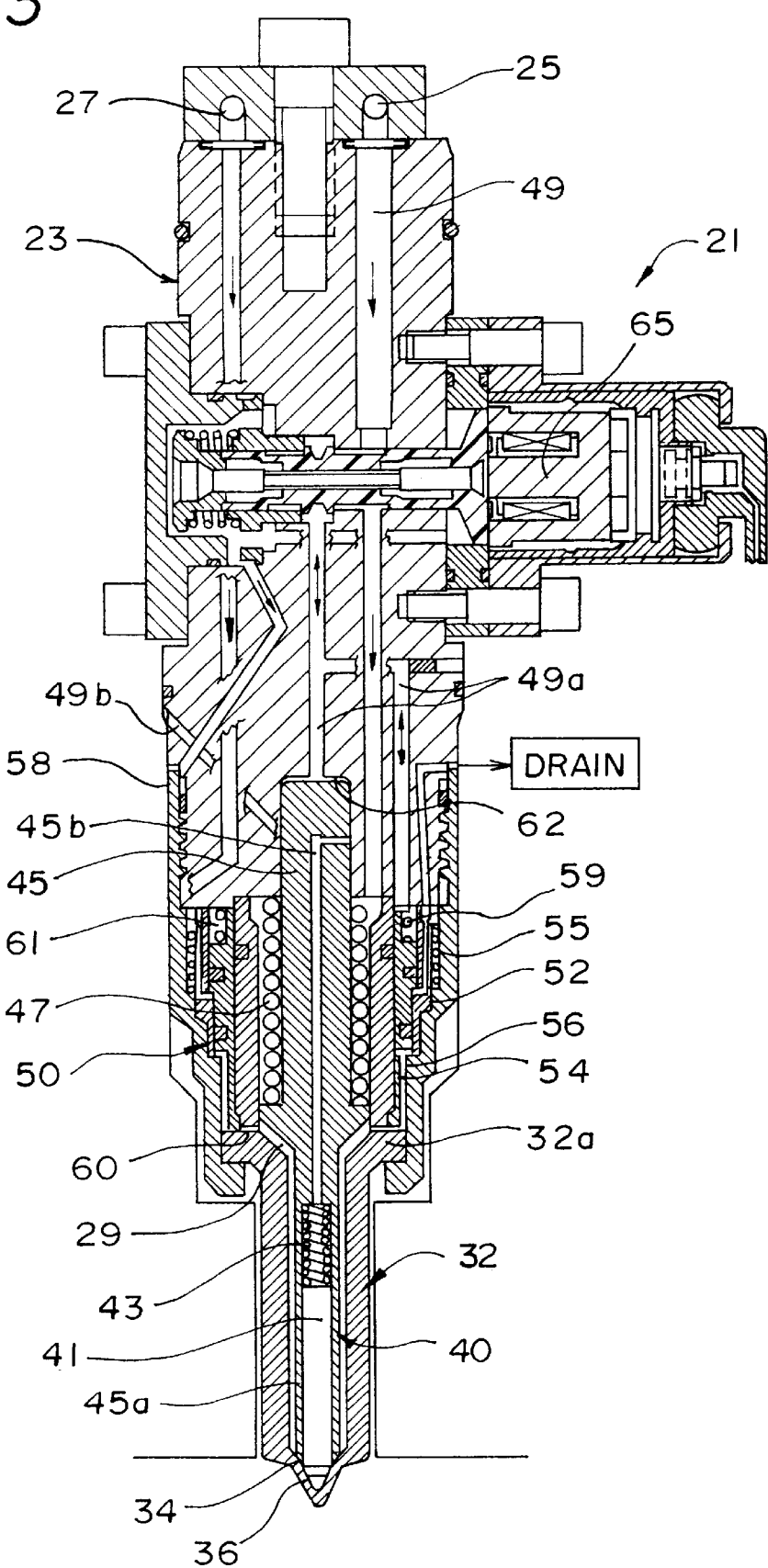
FIG. 3 is a cross-sectional view of a preferred embodiment of an effervescent diesel injector of a pulsed flow type in accordance with the present invention.

FIG. 3 shows a preferred embodiment VCO type injector 21 which is constructed in accordance with the present invention. Effervescent injector 21 has an injector body 23 to which a supply of fuel is connected at a fuel inlet passage 25 and a supply of pressurized gas, such as air, is connected at a gas inlet passage 27. A mixing chamber 29 is formed in an injection nozzle 32 that is mounted at the opposite end of the injector body 23 from the fuel and gas inlet passages 25, 27.

Because the effervescent injector 21 operates at relatively low pressure levels (the same as those noted above for the FIG. 1 embodiment) when compared with conventional liquid diesel injections systems, a larger nozzle flow capability is required in order to keep the injection duration close to optimum. For this reason, the nozzle 32 should have a spray hole area that is 2–2.5 times larger that the spray hole area of conventional nozzles would be for injecting the same quantity. However, such a large spray hole area could cause atomization problems and extremely short injection duration at low injected fuel quantities. Therefore, to resolve this problem, the nozzle 32 has been provided with two rows of spray holes. That is, a first row of spray holes 34 constitute idle or secondary spray holes, e.g., 4 holes with a 100 pph flow rate, and below them is second row of primary spray holes 36, e.g., 8 holes with a 400 pph flow rate. As described in greater detail below, under low fueling conditions, only the secondary spray holes 34 are opened, while under high fueling conditions both the primary and secondary holes 36, 34 are opened, providing a combined 500 pph flow rate.

To enable the primary spray holes 36 to remain closed while the secondary spray holes 34 are opened, a fuel control valve is provided which is comprised of primary and secondary fuel control valves, each of which controls flow through a respective one of said two sets of injection spray holes 34, 36. In particular, the primary and secondary fuel control valves are formed as an articulated needle valve 40 having a secondary needle 41 which is spring-loaded into a position closing the secondary spray holes 36 by a spring 43 which is displaceably mounted within a sleeve-shaped end 45a of a primary needle 45. Likewise, the primary needle 45 is spring-loaded by a spring 47 into a position closing the primary spray holes 34. Fuel from inlet passage 25, as explained further below, is also used to hold down the primary fuel control valve needle 45, in conjunction with the spring 47 while a secondary pressure source acts together with spring 43 to hold down the secondary valve needle 41.

Mixing chamber 29 is in constant communication with fuel from inlet passage 25, the fuel passing around the spring 47 and the primary needle 45 from the main fuel passage 49. On the other hand, the supply of pressurized gas through gas inlet 27 is closed off from the mixing chamber 29, except when fuel is being injected, by a gas control valve 50. The gas control valve 50 is comprised of a stationary gas valve barrel 52 and a gas valve sleeve 54 which is axially displaceable within barrel 52. To simplify manufacture, particularly with respect to concentricity issues, it is advantageous for stationary gas valve barrel 52 to be a "floating" part supported on a barrel spring 55.

A gas reservoir 56 is formed between the gas valve sleeve 54 and the inner wall of the nozzle retainer 58, which is threaded onto the lower end of the injector body 23. The valve sleeve 54 is spring loaded toward its closed position by a gas valve spring 59 located in a gas valve control chamber 61 formed by a shoulder at the top end of the valve sleeve 54. In this closed position, the lower end of the gas valve sleeve is held against a shoulder 32a of the injection nozzle 32, thereby blocking communication between the gas reservoir 56 and a ring of gas orifices 60, for example, 8 orifices of 0.38 mm, which extend through an adjoining portion of the wall of the injection nozzle 32 and open into the upper end of the mixing chamber 29.

To prevent the pressure of the fuel in mixing chamber 29 from overcoming spring 47, and the gas pressure in gas reservoir 56 from overcoming spring 59, the main fuel passage 49 communicates with a needle valve control passage 49a. In this way, when the fuel injector 21 is inactive, the pressure of the fuel supply acts on the upper end of the primary needle 45 and the gas valve sleeve 54 due to the needle valve control passage 49a connecting the main fuel passage with both a needle valve control chamber 62 formed in the nozzle body 23 above the primary needle 45 and with the gas valve control chamber 61. On the other hand, the secondary needle valve control passage 49b independently controls the pressure acting on the secondary needle, being connected at its inner end to a passage 45b which runs through the primary needle to the interior of the sleeve 45a at an area located above the secondary needle 41, and at its outer end to a fuel rail supplying fuel to inlet passage 49b via a separate passage having an independently controlled flow pressure switching valve therein which, like the fuel rail, gas supply line, fuel pump, gas pump, gas pressure regulator, sensors, electronic fuel control valve and other components which are necessary to operation of a liquid-gas fuel injection system, but which are not part of the fuel injector itself, is not shown in the accompanying drawings and is not described in detail, being known per se and forming no part of the present invention.

Opening and closing of the gas control valve and the primary fuel control valve is produced by means of a solenoid valve 65 which is, preferably, in the form of a three-way, on-off solenoid valve which is de-energized when injection is not being performed. A three-way valve configuration is preferred in order to be able to rapidly pressurize and de-pressurize the relatively large control volumes of chambers 61, 62 within 0.1 to 0.2 ms.

When injection is to be initiated, the solenoid valve 65 is turned on and switches to a position which communicates the chamber 62 at upstream end of the primary fuel control valve 45 and the gas control chamber 61 of the gas control valve 50 to drain pressure, venting the fuel pressure acting on this valves and allowing them to pop open simultaneously under the action of the pressure in mixing chamber 29 and in gas reservoir 56 and against the force of springs 47, 59. The primary fuel control valve 45 and the gas control valve 50 are opened at the same time to ensure that the fuel is not caused to backflow up the gas line or to be overdiluted (which could occur if the gas control valve 50 opens first) and to undermixing (which could occur if the fuel control valve 40 opens first).

In practice, except for an initial priming injection, each injection will consist at least in part of gas-fuel foam which was produced during the preceding injection, depending on the volume of the injection dose. That is, at low injection volumes, each injection will use only gas-fuel aeration which was produced during a prior injection while at high volumes the existing volume of gas-fuel foam will be exhausted before the injection dose has been completed. The volume of fuel injected is a function of how long the solenoid valve 65 is energized.

Should gas pressure fail, spring 59 will hold the gas control sleeve 54 in its closed position, even though the pressure in gas valve control chamber 61 has been relieved, because the fuel pressure in the mixing chamber 29 will be unable to act on the gas control sleeve 54 in an opening direction. This feature enables the injector to operate in a "limp home" mode by injecting only liquid fuel.

By controlling the pressure of fuel supplied by the secondary needle valve control passage 49b, the secondary needle 41 can be kept closed against pressure in the mixing chamber 29. However, if the pressure of the fuel acting on the secondary needle 41 via passage 49b is allowed to drop below a certain level when the primary needle 45 is open, the secondary needle 41 will pop open against its spring 43. Thus, by manipulating the pressure acting on the secondary needle 41, the number of active spray holes can be preselected for a given operating condition of the engine with which the injector is being used. A small number of spray holes are selected when the injection pressure and/or injected quantity fuel volume needs to be low and the effectiveness of effervescent atomization is not as good.

It is noted that any gas can be used to create the gas-fuel aeration. Air is usually the most convenient gas; but it is possible to use other gases, including exhaust gases from the engine itself or other combustion sources. By regulating the pressure of the gas used, the GLR can be adjusted. Furthermore, it is important to keep an optimum distance, e.g., 50 mm, between the spray holes 34, 36, and the gas orifices 32a to obtain the best results in spray quality.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. An effervescent fuel injector assembly comprising an injector body having an injection nozzle with at least one injection orifice therein, a mixing chamber formed in the injector body upstream of said at least one injection orifice, a fuel supply line for supplying liquid fuel to said mixing chamber, a gas control valve mounted in the injector body for opening and closing communication between said mixing chamber and a gas supply line, orifice means for introducing gas under pressure into fuel in the mixing chamber in a manner producing a gas-fuel aeration in said mixing chamber, a fuel control valve disposed in said injector body for opening and closing communication between said mixing chamber and said at least one nozzle orifice, and control means for opening said gas control valve simultaneously with at least partial opening of said fuel control valve.

2. The effervescent fuel injector assembly according to claim 1, wherein said at least one nozzle orifice comprises two sets of multiple injection nozzle orifices; wherein said fuel control valve comprises primary and secondary fuel control valves, each of which controls flow through a respective one of said two sets of multiple injection orifices; and means for causing the primary fuel control valve to open simultaneously with opening of said gas control valve, the secondary fuel control valve being selectively openable at the same time as and later than the primary fuel control valve for regulating the number of nozzle orifices from which the gas-fuel aeration is injected.

3. The effervescent fuel injector assembly according to claim 2, wherein a first of said two sets of multiple injection nozzle orifices contains a larger number of orifices with a greater combined flow through area than a second of said two sets of multiple injection nozzle orifices; and wherein the primary and secondary fuel control valves open and close said first and second sets respectively.

4. The effervescent fuel injector assembly according to claim 3, wherein said primary and secondary fuel control valves are formed as parts of an articulated needle valve having a spring-loaded secondary needle displaceably mounted within sleeve-shaped end of a spring-loaded primary needle for controlling said first and second sets of multiple injection nozzle orifices, respectively.

5. The effervescent fuel injector assembly according to claim 4, wherein said control means comprises a three-way, on-off solenoid valve for communicating an upstream end of said primary fuel control valve and an upstream end of said gas control valve with a source of high pressure in a first position thereof, and for simultaneously exposing said upstream end of said primary fuel control valve and said upstream end of said gas control valve to drain pressure in a second position thereof.

6. The effervescent fuel injector assembly according to claim 5, wherein an annular array of gas orifices connect said mixing chamber with said gas control valve at an upstream end of the mixing chamber.

7. The effervescent fuel injector assembly according to claim 6, wherein said mixing chamber and the gas orifices are formed in said injection nozzle.

8. The effervescent fuel injector assembly according to claim 1, wherein said control means comprises a three-way, on-off solenoid valve for communicating an upstream end of said fuel control valve and an upstream end of said gas control valve with a source of high pressure in a first position thereof, and for simultaneously exposing said upstream end of said fuel control valve and said upstream end of said gas control valve to drain pressure in a second position thereof.

9. The effervescent fuel injector assembly according to claim 1, wherein an annular array of gas orifices connect said mixing chamber with said gas control valve at an upstream end of the mixing chamber.

10. The effervescent fuel injector assembly according to claim 9, wherein said mixing chamber and the gas orifices are formed in said injection nozzle.

11. An effervescent fuel injector assembly comprising an injector body having an injection nozzle with at least one injection orifice therein, a mixing chamber formed in the injector body upstream of said at least one injection orifice, a liquid fuel supply line for supplying liquid fuel to said mixing chamber, a gas supply passage for supplying a gas under pressure to said mixing chamber and for introducing the gas under pressure into fuel in the mixing chamber at a distance upstream from said at least one injection orifice and in a manner producing a gas-fuel foam in said mixing chamber and an atomized fuel spray output from said at least one injection orifice having fuel droplets of a Sauter Mean Diameter which is equal to or less than about 5 to 6 microns at fuel and gas supply pressures of about 8 to 10 ksi or less.

12. The effervescent fuel injector assembly according to claim 11, wherein an annular array of gas orifices is disposed for introducing the gas under pressure into fuel in the mixing chamber at a distance of about 5 cm upstream from said at least one injection orifice.

13. The effervescent fuel injector assembly according to claim 11, wherein at least one injection orifice has a flow through capacity of from about 100 pph to about 500 pph.

14. The effervescent fuel injector assembly according to claim 10, wherein at least one injection orifice has a flow through capacity of from about 100 pph to about 500 pph.

15. The effervescent fuel injector assembly according to claim 10, wherein said at least one nozzle orifice comprises multiple injection nozzle orifices; wherein a fuel control valve is provided for controlling flow from said mixing chamber through said multiple injection orifices; wherein a gas control valve is provided for controlling flow from said gas supply passage into the mixing chamber; and wherein means are providing for causing the fuel control valve to open simultaneously with opening of said gas control valve.

16. The effervescent fuel injector assembly according to claim 15, wherein an annular array of gas orifices is disposed downstream of said gas control valve for introducing the gas under pressure into the fuel in the mixing chamber at a distance of about 5 cm upstream from said at least one injection orifice.

17. The effervescent fuel injector assembly according to claim 16, wherein at least one injection orifice has a flow through capacity of from about 100 pph to about 500 pph.

18. The effervescent fuel injector assembly according to claim 15, wherein at least one injection orifice has a flow through capacity of from about 100 pph to about 500 pph.

19. The effervescent fuel injector assembly according to claim 15, wherein said multiple injection nozzle orifices are arranged in plural sets; wherein a plural fuel control valves are provided, each of the fuel control valves controlling flow through a respective set injection nozzle orifices; and wherein said fuel control valves are separately controllable for regulating the number of nozzle orifices from which the gas-fuel aeration is injected.

* * * * *